United States Patent
Uemura et al.

(10) Patent No.: US 10,113,300 B2
(45) Date of Patent: Oct. 30, 2018

(54) WORK VEHICLE AND RIPPER DEVICE

(71) Applicant: KOMATSU LTD., Tokyo (JP)

(72) Inventors: Takuya Uemura, Hirakata (JP); Tomoaki Tsuji, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/537,484

(22) PCT Filed: Feb. 12, 2016

(86) PCT No.: PCT/JP2016/054197
§ 371 (c)(1),
(2) Date: Jun. 19, 2017

(87) PCT Pub. No.: WO2016/140041
PCT Pub. Date: Sep. 9, 2016

(65) Prior Publication Data
US 2018/0002892 A1 Jan. 4, 2018

(30) Foreign Application Priority Data
Mar. 2, 2015 (JP) .................... 2015-040109

(51) Int. Cl.
| | | |
|---|---|---|
| *E02F 5/32* | (2006.01) | |
| *E02F 3/76* | (2006.01) | |
| *E02F 9/26* | (2006.01) | |
| *A01B 13/08* | (2006.01) | |
| *A01B 35/14* | (2006.01) | |

(52) U.S. Cl.
CPC ............. *E02F 5/32* (2013.01); *E02F 3/7618* (2013.01); *E02F 9/264* (2013.01); *A01B 13/08* (2013.01); *A01B 35/14* (2013.01)

(58) Field of Classification Search
CPC ........................................................ E02F 5/32
USPC ........................... 172/272, 699, 720; 37/367
See application file for complete search history.

(56) References Cited

U.S. PATENT DOCUMENTS

| | | | |
|---|---|---|---|
| 2,153,038 A | 4/1939 | Corbett | |
| 3,503,456 A * | 3/1970 | Larson | A01B 13/08 172/464 |
| 3,752,239 A | 8/1973 | Kelley | |
| 3,887,015 A | 6/1975 | Kelley | |
| 4,013,129 A | 3/1977 | Wilkinson | |
| 4,042,261 A * | 8/1977 | Babbitt, Jr. | B62D 49/065 172/699 |

(Continued)

FOREIGN PATENT DOCUMENTS

JP         11-217853 A         8/1999

OTHER PUBLICATIONS

The International Search Report for the corresponding international application No. PCT/JP2016/054197, dated Apr. 26, 2016.

*Primary Examiner* — Gary S Hartmann
(74) *Attorney, Agent, or Firm* — Global IP Counselors, LLP

(57) ABSTRACT

A ripper device includes a first cylinder, a shank, and an arm. The first cylinder includes a tube and a rod, and is disposed to extend and retract in the forward and backward direction in a plan view of the ripper device. The shank is disposed aligned with the first cylinder in the forward and backward direction in the plan view. The arm supports the shank and overlaps the tube of the first cylinder in the plan view.

14 Claims, 8 Drawing Sheets

(56) References Cited

U.S. PATENT DOCUMENTS

| | | | | |
|---|---|---|---|---|
| 4,321,970 | A * | 3/1982 | Thigpen | E02F 5/32 |
| | | | | 172/464 |
| 8,074,726 | B1 * | 12/2011 | Hall | E02F 5/326 |
| | | | | 172/40 |
| 9,062,437 | B2 * | 6/2015 | Hall | E02F 9/2033 |
| 9,580,889 | B2 * | 2/2017 | Kure | F01P 5/043 |
| 9,702,113 | B2 * | 7/2017 | Kotaki | B60R 1/00 |
| 2017/0328029 | A1 * | 11/2017 | Tsuji | E02F 5/32 |
| 2018/0029464 | A1 * | 2/2018 | Uemura | B60K 13/02 |
| 2018/0050588 | A1 * | 2/2018 | Uemura | B60K 15/063 |
| 2018/0056776 | A1 * | 3/2018 | Oshikawa | B60K 11/04 |
| 2018/0202131 | A1 * | 7/2018 | Tsukamoto | B60R 1/00 |

* cited by examiner

WORK VEHICLE AND RIPPER DEVICE

CROSS-REFERENCE TO RELATED APPLICATIONS

This application is a U.S. National stage application of International Application No. PCT/JP2016/054197, filed on Feb. 12, 2016. This U.S. National stage application claims priority under 35 U.S.C. § 119(a) to Japanese Patent Application No. 2015-040109, filed in Japan on Mar. 2, 2015, the entire contents of which are hereby incorporated herein by reference.

BACKGROUND

Field of the Invention

The present invention relates to a work vehicle and a ripper device.

Description of the Related Art

A ripper device is sometimes mounted on a work vehicle (U.S. Pat. No. 3,887,015). The ripper device is attached to the rear part of the work vehicle. The ripper device includes a shank, a tilt cylinder that actuates the shank, an arm that movably supports the shank, and a lift cylinder that raises and lowers the shank. To perform work, the shank is lowered by the lift cylinder. The shank is then actuated by the tilt cylinder so that a ripper tip at the distal end of the shank digs into the ground. When no work is to be performed, the shank is raised by the lift cylinder.

Ripping is performed with the ripper device while the operator monitors the ripper tip. A large opening is provided in the center part of the arm for this purpose. The operator watches the ripper tip through this opening.

SUMMARY

However, when an opening is provided in the arm, soil that has been piled up may fall through the opening and land on the arm. When this happens, soil can hit a cylinder disposed at a position that is aligned with the ripper tip in the forward and backward direction.

It is an object of the present invention to provide a ripper device and a work vehicle with which the effect on a cylinder by the incursion of soil can be avoided.

The ripper device according to one aspect of the present invention is a ripper device that is attached to a work vehicle. The ripper device includes a first cylinder, a shank, and an arm. The first cylinder includes a tube and a rod and is disposed so as to extend and retract in the forward and backward direction in plan view. The shank is disposed aligned with the first cylinder in plan view. The arm supports the shank and overlaps the tube of the first cylinder in plan view. With the ripper device in this aspect, soil can be prevented by the arm from coming into contact with the first cylinder. Therefore, the effect on the first cylinder that soil incursion would otherwise have can be avoided.

The arm may have a tapered shape such that the size of the arm decreases toward the shank in plan view. In this case, the arm does not get in the way when checking the lower end of the shank. Therefore, the operator can check the work location of the ripper device.

There may be only one shank, and there may be only one first cylinder. In plan view the first cylinder and the shank may be disposed on the same line extending in the forward and backward direction.

The arm may include a first side face and a second side face on the left and right. The first side face may be inclined with respect to the forward and backward direction so that it approaches the second side face moving toward the rear. In this case, since the first side face is inclined with respect to the forward and backward direction, the lower end of the shank can be checked from the first side face side of the arm.

The second side face may be inclined with respect to the forward and backward direction so that it approaches the first side face moving toward the rear. In this case, the lower end of the shank can be checked from the second side face side of the arm.

The arm may include a first arm proximal end, a second arm proximal end, and a concave portion. The first arm proximal end is attached to the work vehicle. The second arm proximal end is attached to the work vehicle and is disposed away from the first arm proximal end in the left and right direction. The concave portion is disposed between the first arm proximal end and the second arm proximal end in the left and right direction. The length of the concave portion in the forward and backward direction may be equal to or less than one-third the length of the arm in the forward and backward direction. In this case, there will be less damage to the arm or the cylinders than when the arm includes a large concave portion. Also, the arm can be made more compact.

The ripper device may further include a second cylinder. The second cylinder is disposed to the lateral side of the first cylinder in plan view and actuates the shank. Part of the arm may be located under the second cylinder.

The work vehicle according to another aspect of the present invention includes a vehicle body, the above-mentioned ripper device, and an imaging device. The ripper device is attached to the rear part of the vehicle body. The imaging device captures images of the work location of the ripper device. With the work vehicle according to this aspect, soil can be prevented by the arm from coming into contact with the first cylinder. Therefore, the effect on the first cylinder that soil incursion would otherwise have can be avoided. Also, the operator can check the work location of the ripper device by looking at the captured image.

The imaging device may be attached to the end on the left or right side of the rear part of the vehicle body. In this case, the lower end of the shank can be imaged by the imaging device without being obscured by the arm.

The first cylinder may be attached to the center part of the vehicle body in the vehicle width direction. In this case, the twisting load exerted on the vehicle body from the first cylinder can be reduced as compared to when a pair of left and right first cylinders are disposed apart from each other on the left and right. Also, by eliminating the concave portion of the arm, or making it smaller, even though the first cylinder is attached to the center part of the vehicle body in the vehicle width direction, damage to the first cylinder caused by the build-up of soil during ripper work can be reduced.

The imaging device may be disposed laterally outward of the proximal end of the arm at the rear part of the vehicle body. In this case, the lower end of the shank can be easily imaged by the imaging device.

The imaging device may be disposed higher than the arm at the rear part of the vehicle body. In this case, because the arm has a tapered shape, even if the imaging device is disposed higher than the arm, the lower end of the shank can be easily imaged to the lateral side of the arm.

The vehicle body may further include a crawler belt disposed on a lateral side of the vehicle body. The crawler belt may be disposed under the imaging device. When the imaging device is disposed at a low position, then the lower end of the shank can be easily imaged by the imaging device. However, when the crawler belt is located under the imaging device, there will be a limit to how low the imaging device can be disposed. With the work vehicle according to this aspect, because the arm has a tapered shape, even when the imaging device is disposed above the crawler belt, the lower end of the shank can still be easily imaged.

The present invention provides a work vehicle and a ripper device with which the effect on a cylinder by soil incursion can be avoided.

DETAILED DESCRIPTION OF EXEMPLARY EMBODIMENTS

Figure 1:
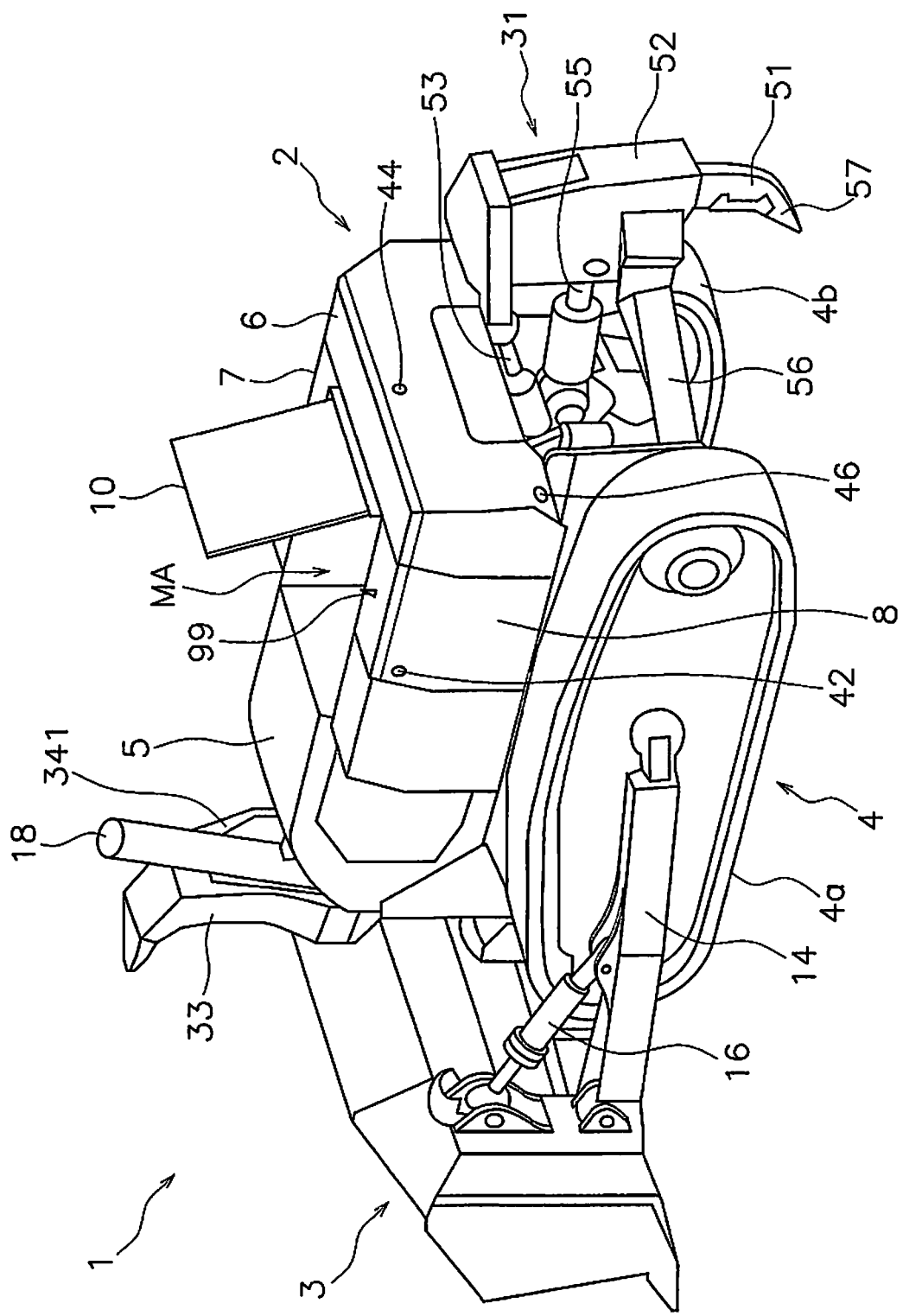
FIG. 1 is an oblique view of a work vehicle according to an exemplary embodiment.
Figure 2:
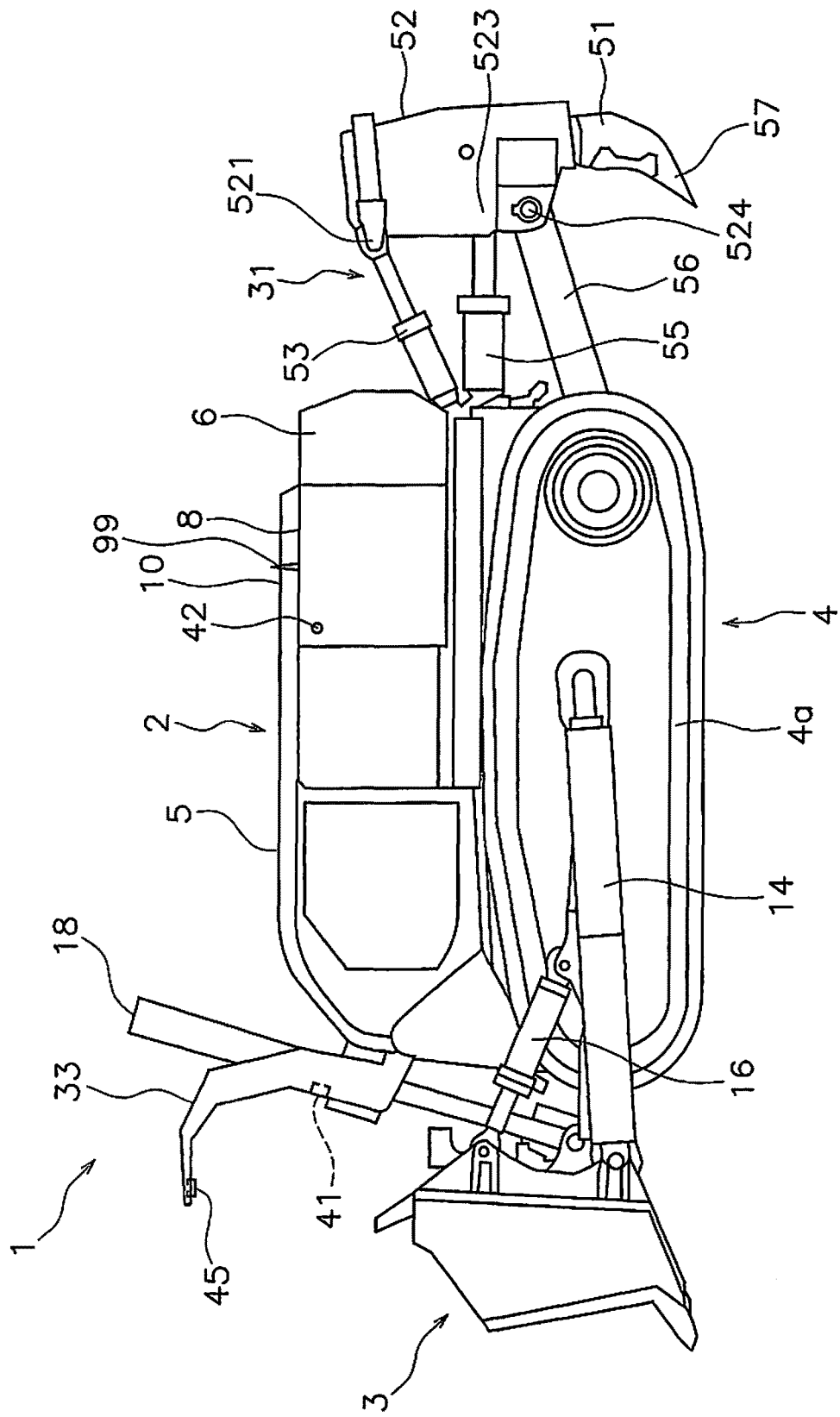
FIG. 2 is a side elevational view of the work vehicle.
Figure 3:
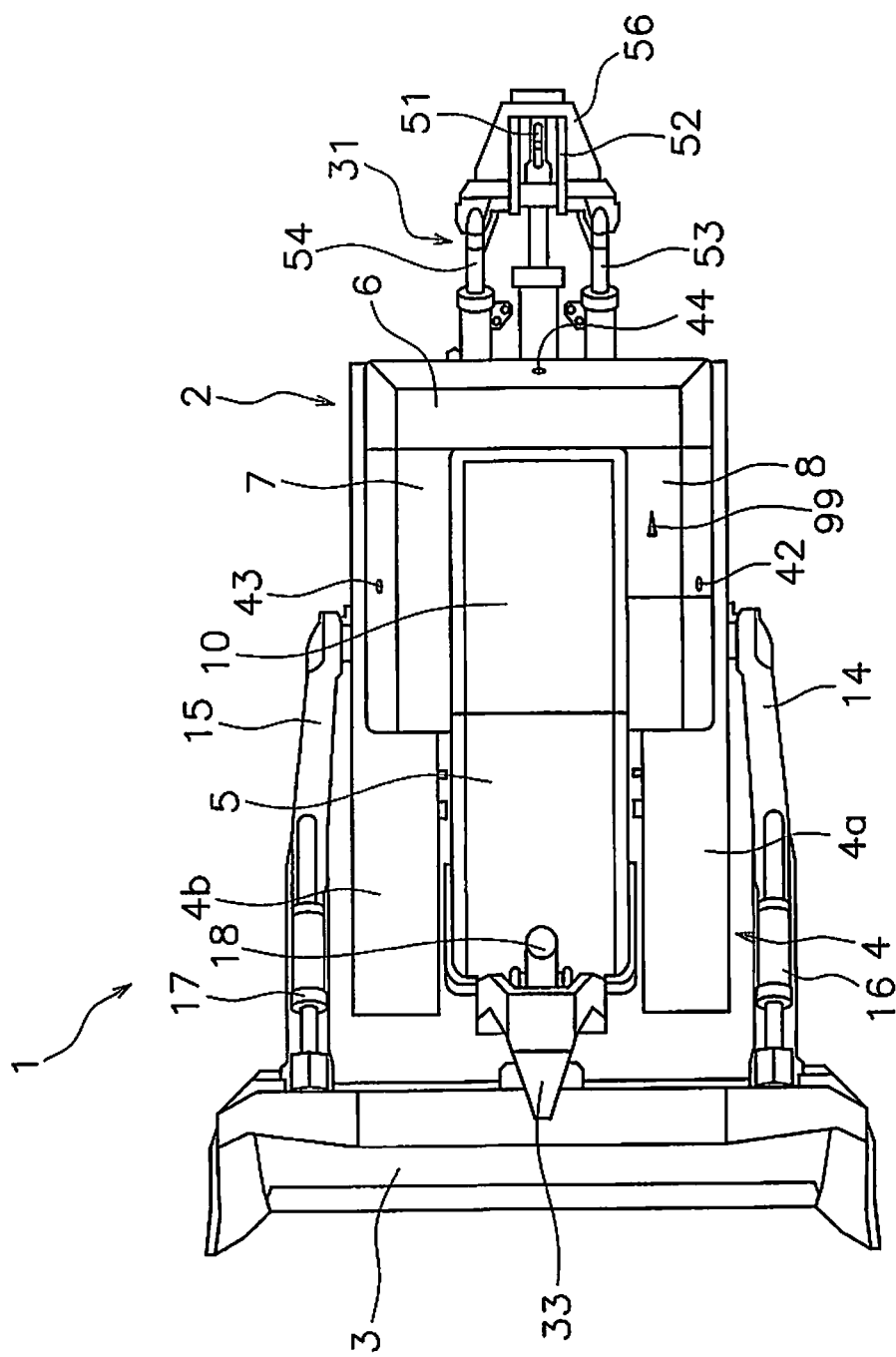
FIG. 3 is a top plan view of the work vehicle.
Figure 4:
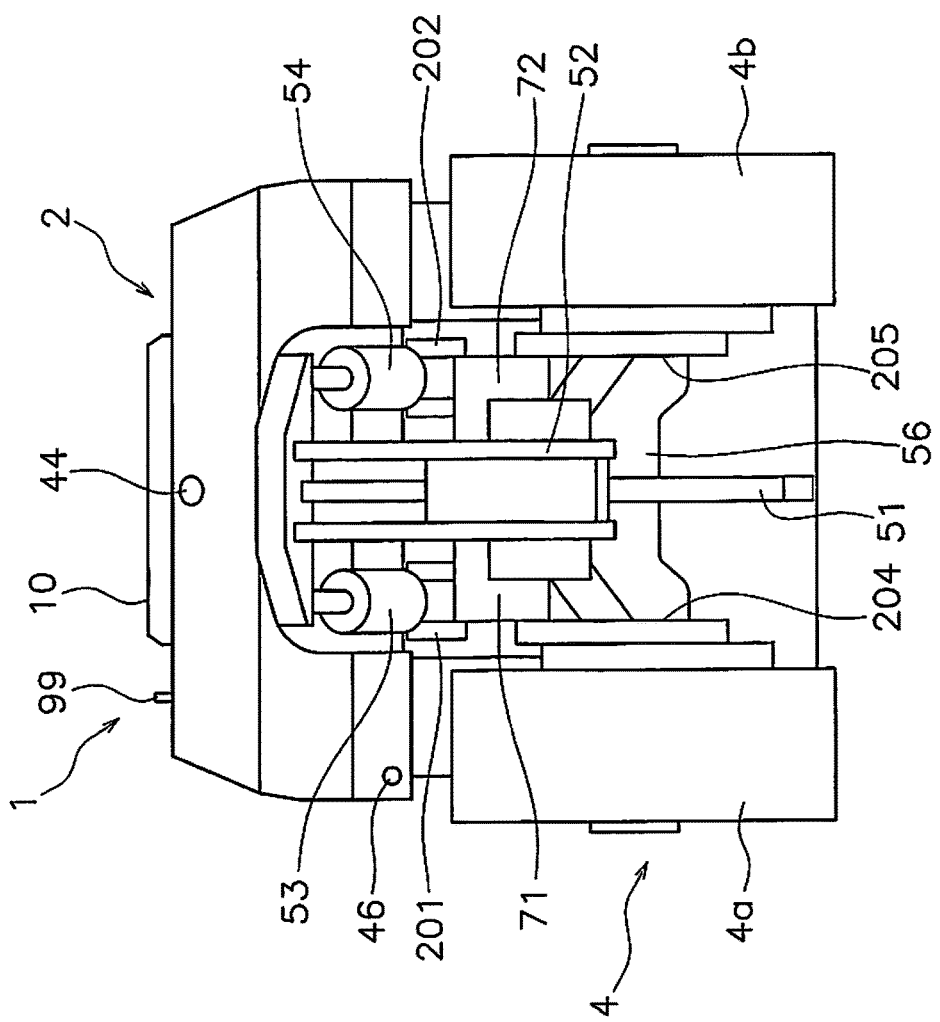
FIG. 4 is a rear elevational view of the work vehicle.

A work vehicle 1 according to an exemplary embodiment will now be described through reference to the drawings. FIG. 1 is an oblique view of the work vehicle 1 according to this embodiment. FIG. 2 is a side elevational view of the work vehicle 1. FIG. 3 is a top plan view of the work vehicle 1. FIG. 4 is a rear elevational view of the work vehicle 1. In this exemplary embodiment, the work vehicle 1 is a bulldozer. In this exemplary embodiment, the work vehicle 1 is a vehicle that is not equipped with a cab. As will be discussed below, the work vehicle 1 can be operated remotely. The work vehicle 1 includes a vehicle body 2 and a work implement 3.

The vehicle body 2 includes a travel device 4 and an engine compartment 5. The travel device 4 is used to allow the work vehicle 1 to travel. The travel device 4 includes crawler belts 4a and 4b. The crawler belt 4a is provided on the left side of the vehicle body 2. The crawler belt 4b is provided on the right side of the vehicle body 2. The crawler belts 4a and 4b are driven to propel the work vehicle 1.

The term "front" in this exemplary embodiment means the direction in which the work implement 3 is disposed with respect to the vehicle body 2, and "rear" means the opposite direction. "Left and right" mean the left and right directions when facing the above-mentioned front. The vehicle width direction is another way of saying the left and right direction.

The engine compartment 5 is disposed at the front part of the vehicle body 2. An engine 11 (see FIG. 8) is disposed in the engine compartment 5.

The vehicle body 2 includes a rear compartment 6, a right compartment 7, and a left compartment 8. As shown in FIG. 1, the engine compartment 5, the rear compartment 6, the right compartment 7, and the left compartment 8 are disposed surrounding the outside of a maintenance area MA. The engine compartment 5 is disposed in front of the maintenance area MA. The rear compartment 6 is disposed behind the maintenance area MA. The right compartment 7 is disposed to the right of the maintenance area MA. The left compartment 8 is disposed to the left of the maintenance area MA.

The rear compartment 6 is a fuel tank, for example. The configuration may be such that a fuel tank is housed in the rear compartment 6. A radiator or other such cooling device is disposed in the right compartment 7. A hydraulic fluid tank is disposed in the left compartment 8. What is housed in the compartments 6 to 8 is not limited to what was given here, and may be changed.

A lid 10 is disposed above the maintenance area MA. The lid 10 allows the maintenance area MA to be open and closed. In FIG. 1, the lid 10 is shown in its open state, and in FIGS. 2 to 4 it is shown in its closed state.

Doors (not shown) for opening and closing the engine compartment 5 and the right compartment 7 facing the maintenance area MA are provided to the engine compartment 5 and the right compartment 7. A worker opens the doors of the engine compartment 5 and the right compartment 7 to access the interior of the engine compartment 5 and the right compartment 7 from the maintenance area MA.

The work implement 3 is disposed in front of the vehicle body 2. The work implement 3 is also disposed in front of the engine compartment 5. In this embodiment, the work implement 3 is a blade. The work implement 3 is supported by a left arm 14 and a right arm 15. The left arm 14 is attached to the left side of the vehicle body 2. The right arm 15 is attached to the right side of the vehicle body 2.

A left tilt cylinder 16, a right tilt cylinder 17, and a lift cylinder 18 are attached to the work implement 3. The left tilt cylinder 16 is attached to the left side of the vehicle body 2. The right tilt cylinder 17 is attached to the right side of the vehicle body 2. The left tilt cylinder 16 and the right tilt cylinder 17 are driven by hydraulic fluid from a hydraulic pump 12 (see FIG. 8). The left tilt cylinder 16 and the right tilt cylinder 17 operate the work implement 3 to the left and right.

The lift cylinder 18 is attached in the center part of the vehicle body 2 in the vehicle width direction. With the work vehicle 1, only one lift cylinder 18 is provided. The lift cylinder 18 is disposed in front of the engine compartment 5. The lift cylinder 18 is disposed behind the work implement 3. The lift cylinder 18 is driven by hydraulic fluid from the hydraulic pump 12. The lift cylinder 18 operates the work implement 3 up and down.

Figure 5:
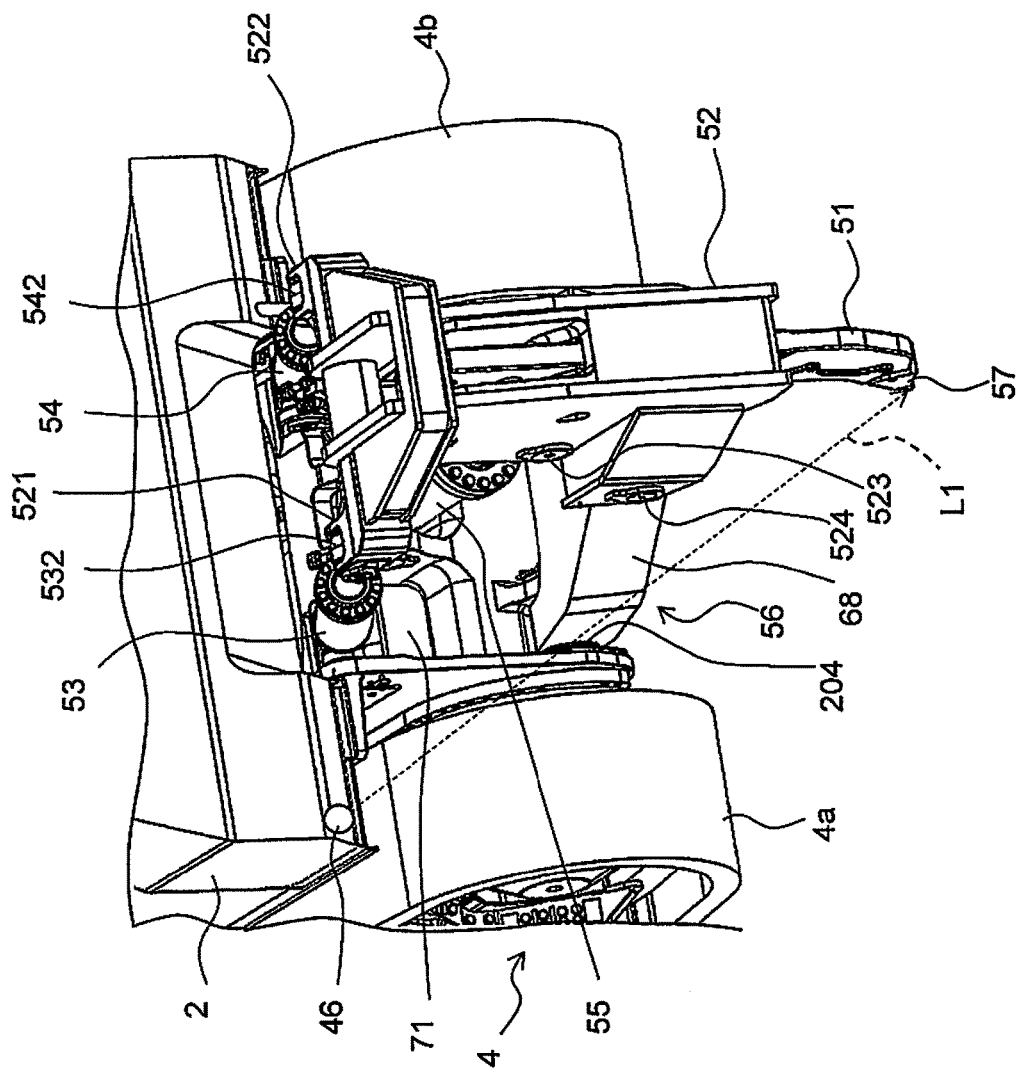
FIG. 5 is an oblique view of the rear part of the vehicle body.
Figure 6:
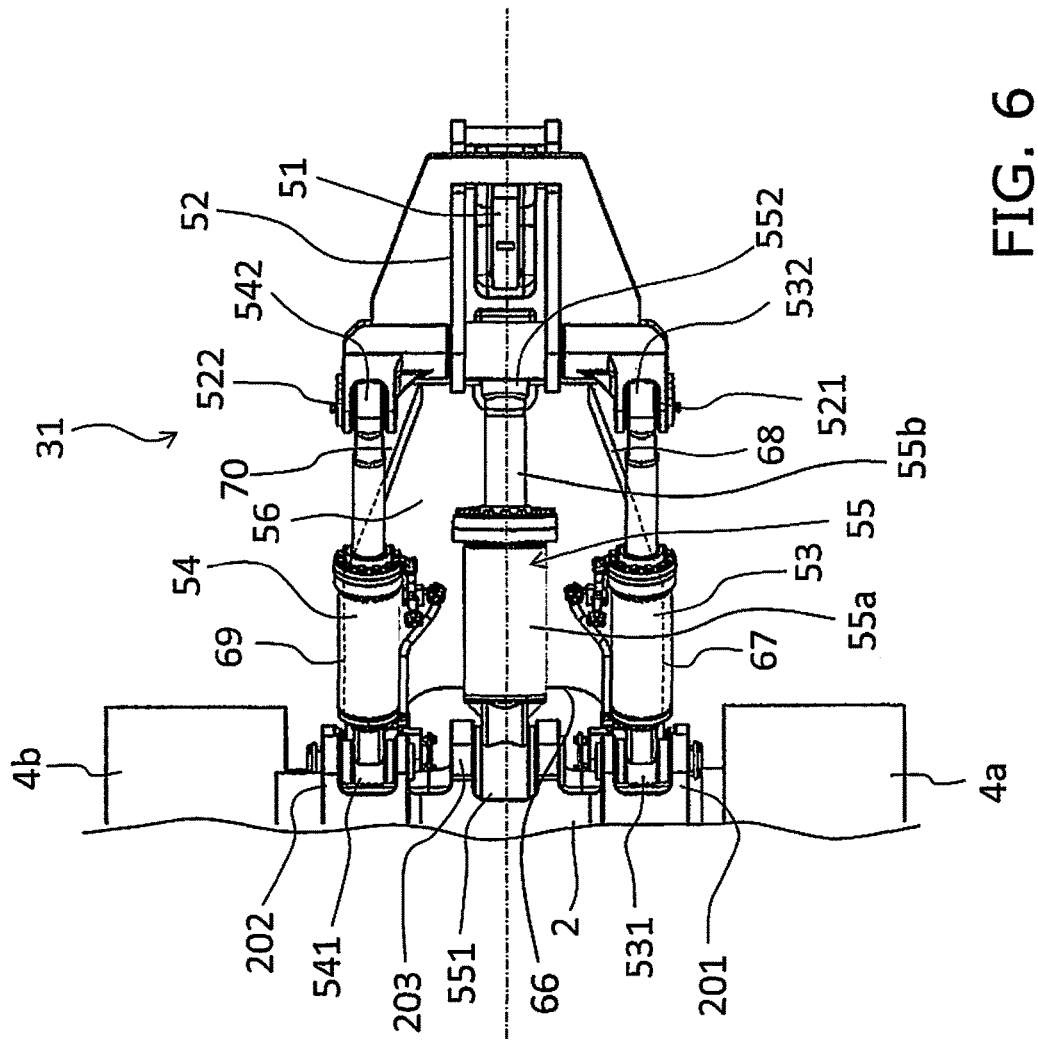
FIG. 6 is a top plan view of the rear part of the vehicle body.

The work vehicle 1 includes a ripper device 31. FIG. 5 is an oblique view of the rear part of the vehicle body 2. FIG. 6 is a plan view of the rear part of the vehicle body 2. The ripper device 31 is disposed behind the vehicle body 2. The ripper device 31 is attached to the rear part of the vehicle body 2. The ripper device 31 includes a shank 51, a ripper support member 52, a first tilt cylinder 53, a second tilt cylinder 54, a lift cylinder 55, and an arm 56.

The shank 51 extends in the up and down direction, and the lower end of the shank 51 curves toward the front. A ripper tip 57 is attached to the lower end of the shank 51. The ripper support member 52 supports the shank 51. The shank 51 protrudes downward from the ripper support member 52.

The ripper support member 52 includes a first tilt attachment portion 521 and a second tilt attachment portion 522. The first tilt attachment portion 521 and the second tilt attachment portion 522 are provided to the upper part of the ripper support member 52. The first tilt attachment portion 521 and the second tilt attachment portion 522 are disposed apart from each other in the vehicle width direction. The first tilt cylinder 53 is rotatably attached to the first tilt attachment portion 521. The second tilt cylinder 54 is rotatably attached to the second tilt attachment portion 522.

The ripper support member 52 includes a lift attachment portion 523. The lift attachment portion 523 is located lower than the first tilt attachment portion 521 and the second tilt attachment portion 522. The lift cylinder 55 is rotatably attached to the lift attachment portion 523.

The ripper support member 52 includes an arm attachment portion 524. The arm attachment portion 524 is located lower than the lift attachment portion 523. The arm 56 is rotatably attached to the arm attachment portion 524.

The first tilt cylinder 53 and the second tilt cylinder 54 are disposed apart from each other in the vehicle width direction. The first tilt cylinder 53 and the second tilt cylinder 54 rotate the shank 51 around the arm attachment portion 524. As shown in FIG. 2, the first tilt cylinder 53 and the second tilt cylinder 54 are inclined upward and rearward. As shown in FIG. 6, the first tilt cylinder 53 and the second tilt cylinder 54 extend in the forward and backward direction of the vehicle in a plan view of the vehicle.

The first tilt cylinder 53 includes a first tilt proximal end 531 and a first tilt distal end 532. The first tilt proximal end 531 is rotatably attached to the vehicle body 2. The first tilt distal end 532 is located on the opposite side from the first tilt proximal end 531 in the axial direction of the first tilt cylinder 53. The first tilt distal end 532 is rotatably attached to the first tilt attachment portion 521.

The second tilt cylinder 54 includes a second tilt proximal end 541 and a second tilt distal end 542. The second tilt proximal end 541 is rotatably attached to the vehicle body 2. The second tilt distal end 542 is located on the opposite side from the second tilt proximal end 541 in the axial direction of the second tilt cylinder 54. The second tilt distal end 542 is rotatably attached to the second tilt attachment portion 522.

The rear part of the vehicle body 2 includes a first tilt attachment portion 201 and a second tilt attachment portion 202. The first tilt attachment portion 201 is rotatably attached to the first tilt proximal end 531. The second tilt attachment portion 202 is rotatably attached to the second tilt proximal end 541.

The lift cylinder 55 is attached to the center part of the vehicle body 2 in the vehicle width direction. The lift cylinder 55 raises and lowers the shank 51 and the ripper support member 52. In a plan view of the vehicle, the lift cylinder 55 is disposed between the first tilt cylinder 53 and the second tilt cylinder 54. In a plan view of the vehicle, the lift cylinder 55 is disposed along an extension of the center line in the vehicle width direction of the vehicle body 2, and extends in the forward and backward direction of the vehicle. The lift cylinder 55 includes a tube 55*a* and a rod 55*b*. In a plan view of the vehicle, the rod 55*b* protrudes rearward from the tube 55*a*. In a plan view of the vehicle, the lift cylinder 55 extends and retracts in the forward and backward direction. In a plan view of the vehicle, the lift cylinder 55 does not overlap the first tilt cylinder 53 or the second tilt cylinder 54. The lift cylinder 55 is located lower than the first tilt cylinder 53 and the second tilt cylinder 54. In a plan view of the vehicle, the lift cylinder 55 is aligned with the shank 51 in the forward and backward direction. The diameter of the lift cylinder 55 is larger than the diameter of the first tilt cylinder 53. The diameter of the lift cylinder 55 is also larger than the diameter of the second tilt cylinder 54.

The lift cylinder 55 includes a lift proximal end 551 and a lift distal end 552. The lift proximal end 551 is rotatably attached to the vehicle body 2. The lift distal end 552 is located on the opposite side of the lift cylinder 55 from the lift proximal end 551 in the axial direction. The lift distal end 552 is rotatably attached to the lift attachment portion 523 of the ripper support member 52. The first tilt proximal end 531 and the second tilt distal end 542 are located higher than the lift distal end 552. The first tilt proximal end 531 and the second tilt proximal end 541 are located higher than the lift proximal end 551.

The rear part of the vehicle body 2 includes a lift attachment portion 203. The lift proximal end 551 of the lift cylinder 55 is rotatably attached to the lift attachment portion 203. The lift attachment portion 203 is located between the first tilt attachment portion 201 and the second tilt attachment portion 202 in the vehicle width direction. The lift attachment portion 203 is located lower than the first tilt attachment portion 201 and the second tilt attachment portion 202.

Figure 7:
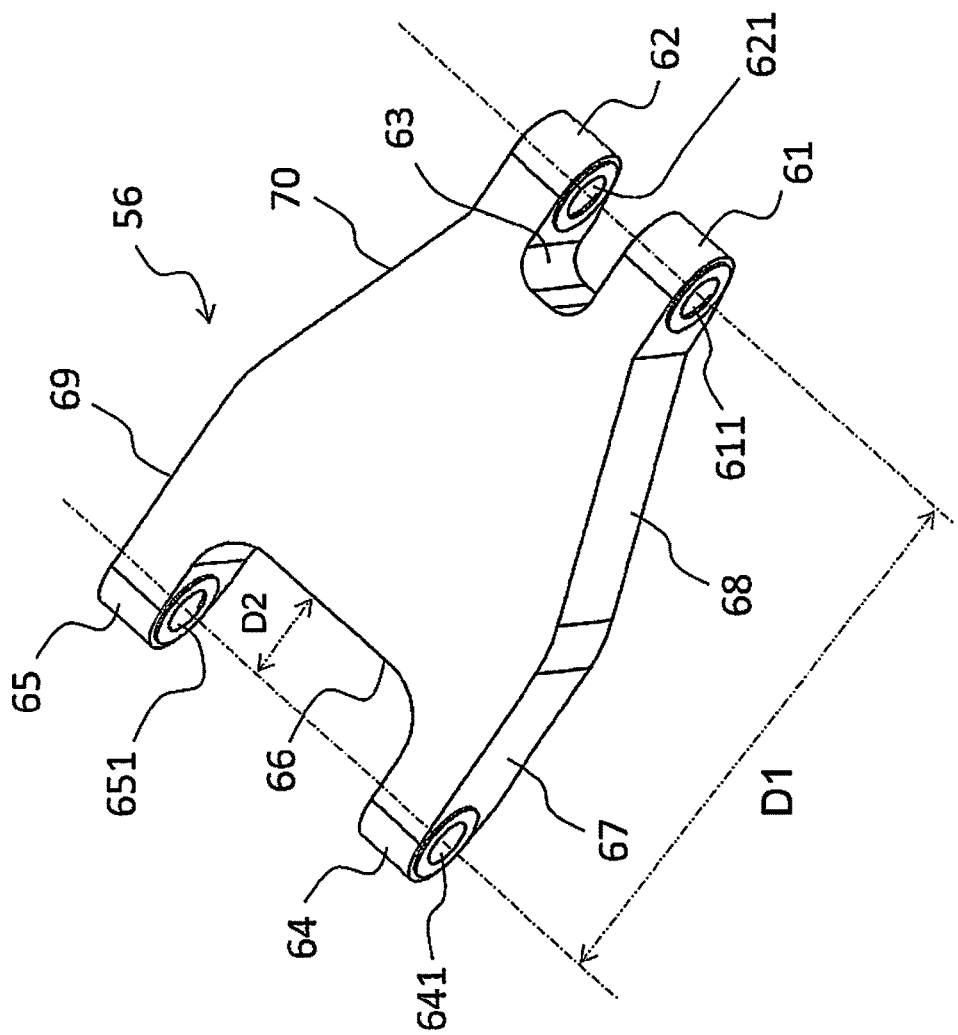
FIG. 7 is an oblique view of the arm of a ripper device.

The arm 56 is rotatably attached to the vehicle body 2. The arm 56 is disposed under the lift cylinder 55. The arm 56 rotatably supports the shank 51 and the ripper support member 52. FIG. 7 is an oblique view of the arm 56. As shown in FIG. 7, the arm 56 includes a first arm distal end 61, a second arm distal end 62, and a distal end-side concave portion 63.

The first arm distal end 61 and the second arm distal end 62 are rotatably attached to the shank 51 and the ripper support member 52. The first arm distal end 61 and the second arm distal end 62 are disposed apart from each other in the vehicle width direction. A hole 611 that passes through in the vehicle width direction is provided to the first arm distal end 61. A hole 621 that passes through in the vehicle width direction is provided to the second arm distal end 62. A pin member is passed through the first arm distal end 61, the second arm distal end 62, the ripper support member 52, and the shank 51 so that the ripper support member 52 and the shank 51 are rotatably attached to the distal end of the arm 56.

The distal end-side concave portion 63 is disposed between the first arm distal end 61 and the second arm distal end 62 in the vehicle width direction. The length of the distal end-side concave portion 63 in the vehicle forward and backward direction is equal to or less than one-third the length of the arm 56 in the vehicle forward and backward direction. Part of the shank 51 is disposed in the distal end-side concave portion 63.

The arm 56 includes a first arm proximal end 64, a second arm proximal end 65, and a proximal end-side concave portion 66. The first arm proximal end 64 and the second arm proximal end 65 are rotatably attached to the vehicle body 2. The second arm proximal end 65 is disposed apart from the first arm proximal end 64 in the vehicle width direction. A hole 641 that passes through in the vehicle width direction is provided to the first arm proximal end 64. A hole 651 that passes through the in vehicle width direction is provided to the second arm proximal end 65.

As shown in FIGS. 4 and 5, a first arm attachment portion 204 and a second arm attachment portion 205 are provided to the rear part of the vehicle body 2. The first arm attachment portion 204 and the second arm attachment portion 205 are located lower than the upper faces of the crawler belts 4*a* and 4*b*. The first arm attachment portion 204 and the second arm attachment portion 205 are located laterally inside of the crawler belts 4*a* and 4*b*. The first arm attachment portion 204 and the second arm attachment portion 205 are located lower than the lift attachment portion 203.

A pin member is passed through the first arm proximal end 64 and the first arm attachment portion 204 so that the first arm proximal end 64 is rotatably attached to the first arm attachment portion 204. A pin member is also passed through the second arm proximal end 65 and the second arm attachment portion 205 so that the second arm proximal end 65 is rotatably attached to the second arm attachment portion 205.

As shown in FIG. 7, the proximal end-side concave portion 66 is disposed between the first arm proximal end 64 and the second arm proximal end 65 in the vehicle width direction. The proximal end-side concave portion 66 has a shape that is recessed from the proximal end toward the distal end side of the arm 56. The length of the proximal end-side concave portion 66 in the vehicle forward and backward direction is equal to or less than one-third of the length of the arm 56 in the vehicle forward and backward direction.

The distance D2 between the proximal end-side concave portion 66 and the center line of the holes 641 and 651 used for attaching the arm 56 to the vehicle body 2 is equal to or less than one-third the length D1 between the center line of the holes 641 and 651 used for attaching the arm 56 to the vehicle body 2 and the center line of the holes 611 and 621 used for attaching the arm 56 to the shank 51.

However, the length of the proximal end-side concave portion 66 is not limited to being no more than one-third the length of the arm 56. The proximal end-side concave portion 66 need only be large enough to allow the removal of the pin member that fixes the first arm proximal end 64 and the first arm attachment portion 204. The proximal end-side concave portion 66 should also be large enough to allow the removal of the pin member that fixes the second arm proximal end 65 and the second arm attachment portion 205.

The arm 56 overlaps the tube 55a of the lift cylinder 55 in plan view. For example, in plan view, the arm 56 overlaps at least half of the tube 55a in the forward and backward direction. The arm 56 may overlap the entire tube 55a in plan view.

The arm 56 has a tapered shape, such that the size of the arm 56 in the vehicle width direction decreases toward the rear of the vehicle body 2. That is, the arm 56 has a tapered shape, such that the size of the arm 56 in the left and right direction decreases from the proximal end of the arm 56 toward the shank 51. Therefore, the width of the distal end of the arm 56 is less than the width of the proximal end of the arm 56.

More precisely, the left face of the arm 56 includes a proximal end-side left face 67 and a distal end-side left face 68. The proximal end-side left face 67 extends from the proximal end to the distal end side of the arm 56. The proximal end-side left face 67 is substantially parallel to the vehicle forward and backward direction. The distal end-side left face 68 is located on the distal end side of the proximal end-side left face 67. The distal end-side left face 68 is inclined with respect to the vehicle forward and backward direction so as to be closer to the center line of the vehicle body 2 in the vehicle width direction, toward the rear of the vehicle body 2.

The right face of the arm 56 includes a proximal end-side right face 69 and a distal end-side right face 70. The proximal end-side right face 69 extends from the proximal end to the distal end side of the arm 56. The proximal end-side right face 69 is substantially parallel to the vehicle forward and backward direction. The distal end-side right face 70 is located on the distal end side of the proximal end-side right face 69. The distal end-side right face 70 is inclined with respect to the vehicle forward and backward direction so as to be closer to the center line of the vehicle body 2 in the vehicle width direction, toward the rear of the vehicle body 2.

As shown in FIG. 6, at least part of the distal end-side left face 68 is located laterally inward of the first tilt cylinder 53. At least part of the distal end-side right face 70 is located laterally inward of the second tilt cylinder 54. In a vehicle plan view, the proximal end-side left face 67 overlaps the first tilt cylinder 53. In a vehicle plan view, the proximal end-side right face 69 overlaps the second tilt cylinder 54. The width of the distal end of the arm 56 is less than the spacing between the first tilt distal end 532 and the second tilt distal end 542. The width of the proximal end of the arm 56 is greater than the spacing between the first tilt proximal end 531 and the second tilt proximal end 541.

The ripper device described above performs a tilt operation and a lift operation. In tilt operation, the tilt cylinders 53 and 54 extend out, but the lift cylinder 55 does not extend or retract, with the length of the lift cylinder 55 being fixed. Consequently, as the lift cylinder 55 and the arm 56 rotate and the distal end of the lift cylinder 55 and the distal end of the arm 56 rise, the shank 51 tilts.

In a lift operation, the lift cylinder 55 retracts, but the tilt cylinders 53 and 54 do not extend or retract, with the length of the tilt cylinders 53 and 54 being fixed. Therefore, the ripper support member 52 is pulled to the vehicle body side, and the tilt cylinders 53 and 54 and the arm 56 rotate so that the distal ends of the tilt cylinders 53 and 54 and the distal end of the arm 56 are lifted. Consequently, the ripper support member 52 and the shank 51 rise.

As shown in FIGS. 4 and 5, the rear part of the vehicle body 2 includes a first disposition portion 71 and a second disposition portion 72. The first disposition portion 71 is disposed under the first tilt attachment portion 201. The first disposition portion 71 is disposed above the first arm attachment portion 204. The second disposition portion 72 is disposed under the second tilt attachment portion 202. The second disposition portion 72 is disposed above the second arm attachment portion 205.

The first disposition portion 71 and the second disposition portion 72 are disposed apart from each other in the vehicle width direction. The lift cylinder 55 is disposed between the first disposition portion 71 and the second disposition portion 72. In other words, the first disposition portion 71 is disposed laterally outward of the lift cylinder 55. The second disposition portion 72 is also disposed laterally outward of the lift cylinder 55.

At the first disposition portion 71 is disposed one or more members that are frequently accessed, such as a coolant reservoir tank, a start switch, an emergency shutoff switch, a fuel tank strainer, a fuel pre-filter, a fuel-water separator, an access light switch, a quick drain plug, a quick charger, or an oil dipstick. One or more of the above-mentioned members are also disposed at the second disposition portion 72.

Figure 8:
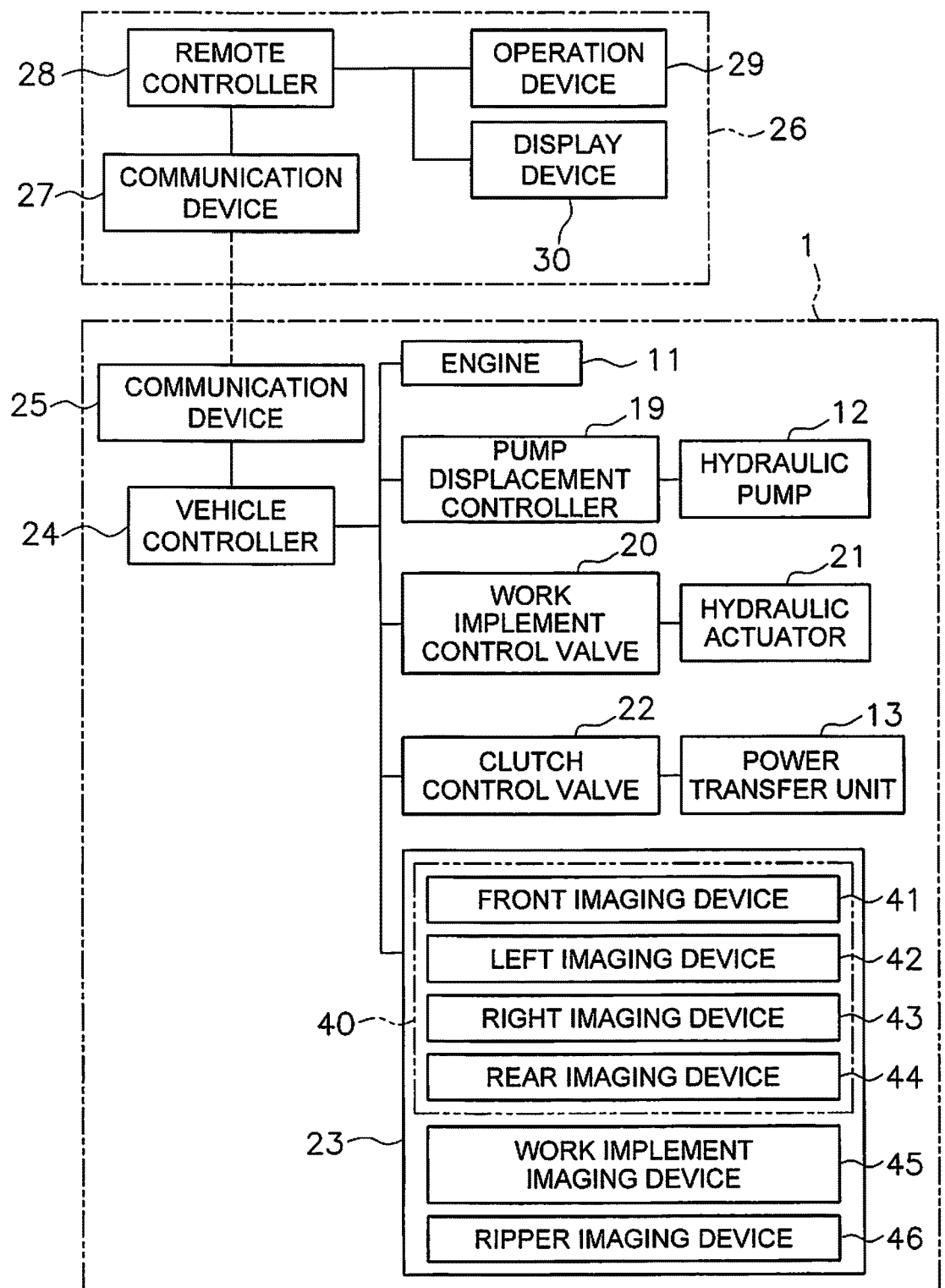
FIG. 8 is a block diagram of the control system of the work vehicle.

FIG. 8 is a block diagram of the control system of the work vehicle 1. As shown in FIG. 8, the work vehicle 1 includes the hydraulic pump 12 and a pump displacement controller 19. The hydraulic pump 12 is driven by the engine 11 and discharges hydraulic fluid. The hydraulic pump 12 is a variable displacement pump, and the pump displacement controller 19 controls the discharge volume of the hydraulic pump 12.

The work vehicle 1 includes a work implement control valve 20 and a hydraulic actuator 21. The hydraulic actuator 21 is driven by hydraulic fluid discharged from the hydraulic pump 12. For example, the hydraulic actuator 21 includes the lift cylinder 18 and the left and right tilt cylinders 16 and 17 of the work implement 3. Also, the hydraulic actuator 21 includes the first and second tilt cylinders 53 and 54 and the lift cylinder 55 of the ripper device 31. The work implement control valve 20 controls the supply and discharge of hydraulic fluid to and from the hydraulic actuator 21.

The work vehicle 1 includes a power transfer unit 13 and a clutch control valve 22. The power transfer unit 13 includes, for example, a transmission and a torque converter. The clutch control valve 22 controls the switching of the transmission clutch, the forward/reverse clutch, the steering clutch, and so forth included in the power transfer unit 13.

The work vehicle 1 includes an imaging device 23. The imaging device 23 acquires images of the surroundings of the work vehicle 1. The imaging device 23 includes peripheral imaging devices 40, a work implement imaging device 45, and a ripper imaging device 46. The peripheral imaging devices 40 capture images of the area around the vehicle body 2. That is, the peripheral imaging devices 40 capture images of the areas ahead of, behind, and to the left and right of the vehicle body 2.

More precisely, the peripheral imaging devices 40 include a front imaging device 41, a left imaging device 42, a right imaging device 43, and a rear imaging device 44. As shown in FIG. 2, the front imaging device 41 is attached to a support member 33. The support member 33 is attached to the front part of the vehicle body 2. The support member 33 is attached to the center part of the vehicle body 2 in the vehicle width direction. The front imaging device 41 captures an image of the area in front of the vehicle body 2.

The left imaging device 42 is attached to the left side of the vehicle body 2. The left imaging device 42 captures an image of the area to the left of the vehicle body 2. As shown in FIG. 3, the right imaging device 43 is attached to the right side of the vehicle body 2. The right imaging device 43 captures an image of the area to the right of the vehicle body 2. The rear imaging device 44 is attached to the rear part of the vehicle body 2. The rear imaging device 44 captures an image of the area to the rear of the vehicle body 2.

The work implement imaging device 45 captures an image of the work implement 3 and the area in front of the work implement 3. The work implement imaging device 45 is disposed above the work implement 3. More precisely, the work implement imaging device 45 is disposed higher than the upper end of the work implement 3. The work implement imaging device 45 is also disposed higher than the front imaging device 41. The work implement imaging device 45 is also disposed more to the front than the front imaging device 41. The work implement imaging device 45 is supported by the support member 33.

The ripper imaging device 46 captures an image of the work location of the ripper device 31. More precisely, the ripper imaging device 46 captures an image of the ripper tip 57 and the area around it. As shown in FIG. 5, the ripper imaging device 46 is attached to the left end of the rear part of the vehicle body 2. As shown in FIG. 1, the ripper imaging device 46 is disposed lower than the rear imaging device 44. The ripper imaging device 46 is disposed higher than the arm 56 at the rear part of the vehicle body 2. The ripper imaging device 46 is disposed laterally outward of the proximal end of the arm 56 at the rear part of the vehicle body 2. The crawler belt 4a is located under the ripper imaging device 46.

As shown in FIG. 5, the distal end-side left face 68 is inclined so as not to overlap the imaginary line L1 linking the ripper imaging device 46 and the lower end of the shank 51. Consequently, the ripper imaging device 46 can capture an image of the lower end of the shank 51, which is located lower than the arm 56, and the area around this lower end, from a position that is higher than the arm 56.

The ripper imaging device 46 may be disposed at the right end of the rear part of the vehicle body 2. Here again, the distal end-side right face 70 is inclined so as not to overlap the imaginary line linking the ripper imaging device 46 and the lower end of the shank 51, so the ripper imaging device 46 can capture an image of the lower end of the shank 51, which is located lower than the arm 56, from a position that is higher than the arm 56, without being blocked by the arm 56. Alternatively, the ripper imaging device 46 may be disposed on both the left and right ends of the rear part of the vehicle body 2.

As shown in FIG. 8, the work vehicle 1 includes a vehicle controller 24 and a communication device 25. The communication device 25 is connected to an antenna 99 (see FIG. 1) installed on the vehicle body 2. The communication device 25 communicates wirelessly with a communication device 27 of a remote control device 26. For example, the remote control device 26 is disposed within a control center that is located away from the job site where the work vehicle 1 is being used. Alternatively, the remote control device 26 may be portable, and may be disposed at the job site.

The vehicle controller 24 is made up of a CPU or other such processor and a RAM, ROM, or other such memory, or a hard disk or other such storage device. The vehicle controller 24 is programmed to control the work vehicle 1 on the basis of a control signal from the remote control device 26. Also, the vehicle controller 24 acquires image data acquired by the imaging device 23 over a wire or wirelessly. The vehicle controller 24 sends the image data captured by the imaging device 23 through the communication device 25 to the communication device 27 of the remote control device 26.

The remote control device 26 includes a remote controller 28 and an operation device 29. The remote controller 28 is made up of a CPU or other such processor and a RAM, ROM, or other such memory, or a hard disk or other such storage device.

The operation device 29 is used by the operator who operates the work vehicle 1. For example, the operation device 29 includes a throttle control device for adjusting the output of the engine 11. The operation device 29 includes a work implement operation device for operating the work implement 3. The operation device 29 also includes a ripper operation device for operating the ripper device 31. The operation device 29 also includes a steering operation device for changing the travel direction of the work vehicle 1 left or right. The remote controller 28 sends an operation signal, which indicates the operation details produced by the operation device 29, through the communication device 27 to the communication device 25 of the work vehicle 1.

The remote control device 26 includes a display device 30. The display device 30 is made up of a CRT, an LCD, an OELD, or another such display, for example. The display device 30 is not limited to these displays, however, and may be some other kind of display.

The communication device 27 of the remote control device 26 receives image data captured by the imaging device 23 from the communication device 25 of the work vehicle 1. The remote controller 28 is programmed to display an image indicating the surroundings of the work vehicle 1 on the display device 30 on the basis of the image data captured by the imaging device 23. For instance, the remote controller 28 may synthesize a bird's-eye view image from the images captured by the imaging device 23, and display the result on the display device 30. Alternatively, the remote controller 28 may display the individual images captured by the imaging device 23 on the imaging device 23.

The operator operates the operation device 29 while looking at the displayed image. Consequently, an operation signal is sent from the communication device 27 of the remote control device 26, and the communication device 25 of the work vehicle 1 receives this operation signal from the remote control device 26. The vehicle controller 24 controls the above-mentioned engine 11, pump displacement controller 19, work implement control valve 20, clutch control valve 22, and so forth on the basis of an operation signal. This allows the operator to operate the work vehicle 1 remotely.

With the work vehicle 1 according to the exemplary embodiment described above, the arm 56 overlaps the tube 55a of the lift cylinder 55 in plan view. Therefore, even when the shank 51 is aligned with the lift cylinder 55 in the forward and backward direction in plan view, soil can be prevented by the arm 56 from coming into contact with the lift cylinder 55. Therefore, the effect on the first cylinder that soil incursion would otherwise have can be avoided.

The arm 56 has a tapered shape, such that the size of the arm 56 in the vehicle width direction decreases toward the rear of the vehicle body. That is, the distal end-side left face 68 and the distal end-side right face 70 of the arm 56 are inclined with respect to the vehicle forward and backward direction so as to approach the center line of the vehicle body 2 in the vehicle width direction. Therefore, the arm 56 does not block the view when the lower end of the shank 51 is being imaged by the ripper imaging device 46, and the lower end of the shank 51 can be properly imaged by the ripper imaging device 46. This means that the operator can easily check the work location of the ripper device 31 by looking at the display device 30 to see the image captured by the ripper imaging device 46.

Also, the operator can easily check the work location of the ripper device 31 without making visual contact with the lower end of the shank 51 through the proximal end-side concave portion 66. Accordingly, the proximal end-side concave portion 66 can be made smaller. This makes it less likely that the arm 56 or the lift cylinder 55 will be damaged. Also, because the arm 56 has a tapered shape, it can be made more compact.

The length of the proximal end-side concave portion 66 of the arm 56 in the vehicle forward and backward direction is equal to or less than one-third the length of the arm 56 in the vehicle forward and backward direction. Therefore, it is less likely that the arm 56 or the lift cylinder 55 will be damaged than when the arm 56 includes a concave portion that is larger than the proximal end-side concave portion 66. Also, the arm 56 can be made more compact.

The lift cylinder 55 is disposed above the arm 56, and is attached in the center part of the vehicle body 2 in the vehicle width direction. Therefore, the vehicle body 2 is subjected to less twisting load from the lift cylinder 55 than when a pair of lift cylinders 55 are disposed apart from each other on the left and right. Also, making the proximal end-side concave portion 66 of the arm 56 smaller makes it less likely that the lift cylinder 55 will be damaged, even though the lift cylinder 55 is attached in the center part of the vehicle body 2 in the vehicle width direction.

The ripper imaging device 46 is disposed laterally outward of the proximal end of the arm 56 at the rear part of the vehicle body 2. Therefore, the lower end of the shank 51 can be easily imaged by the ripper imaging device 46.

Since the crawler belt 4a is located under the ripper imaging device 46, it is not easy to dispose the ripper imaging device 46 lower than the arm 56. Therefore, the ripper imaging device 46 is disposed higher than the arm 56 at the rear part of the vehicle body 2. However, even though the ripper imaging device 46 is disposed higher than the arm 56, because the arm 56 has a tapered shape, the lower end of the shank 51 can be easily imaged to the lateral side of the arm 56.

An exemplary embodiment of the present invention was described above, but the present invention is not limited to or by the above exemplary embodiment, and various modifications are possible without departing from the gist of the invention.

The work vehicle is not limited to being a bulldozer, and may be some other type of work vehicle, such as a wheel loader. The work vehicle is not limited to being a vehicle that is remotely operated, and may be a manned work vehicle. Alternatively, just as with a manned work vehicle, a cab may be provided to the vehicle body, and a device the same as the remote control device 26 may be disposed in this cab. This allows the operator to easily operate the work vehicle 1 while looking at a displayed image.

The number of lift cylinders is not limited to one, and a pair of left and right lift cylinders may be provided.

The number of peripheral imaging devices 40 is not limited to four, and may be three or fewer, or five or more. The layout of the various peripheral imaging devices 40 is not limited to what was given in the above exemplary embodiment, and may be a different layout. The front imaging device 41 may be attached to some other portion besides the support member 33. For example, the front imaging device 41 may be attached to the vehicle body 2.

The number of work implement imaging devices 45 is not limited to one, and may be two or more. The layout of the work implement imaging device 45 is not limited to what was given in the above exemplary embodiment, and may be a different layout. The number of ripper imaging devices 46 is not limited to one, and may be two or more. The layout of the ripper imaging device 46 is not limited to what was given in the above exemplary embodiment, and may be a different layout.

The imaging devices other than the ripper imaging device 46 may be omitted. For instance, a driver's seat may be provided to the vehicle body 2, and the operator may operate the vehicle while visually checking the areas ahead of, behind, and to the left and right of the vehicle. In this case, the operator may use the display device 30 disposed in the cab to check the image captured by the ripper imaging device 46. Also, in this case the support member 33 may be omitted.

A disposition portion may be disposed only under the first tilt attachment portion 201. That is, just the first disposition portion 71 may be provided to the vehicle body 2, and the second disposition portion 72 may be omitted. Alternatively, a disposition portion may be disposed only under the second tilt attachment portion 202. That is, just the second disposition portion 72 may be provided to the vehicle body 2, and the first disposition portion 71 may be omitted. Alternatively, the disposition portions may be eliminated.

Just the distal end-side left face 68 of the arm 56 may be inclined with respect to the vehicle forward and backward direction so as to approach the center line of the vehicle body 2 in the vehicle width direction, toward the rear of the vehicle body 2. Alternatively, just the distal end-side right face 70 of the arm 56 may be inclined with respect to the vehicle forward and backward direction so as to approach the center line of the vehicle body 2 in the vehicle width direction, toward the rear of the vehicle body 2.

The present invention provides a work vehicle and a ripper device with which the effect that soil incursion has on cylinders can be avoided.

The invention claimed is:

1. A ripper device attached to a work vehicle, comprising:
a first cylinder including a tube and a rod, the first cylinder being disposed to extend and retract in a forward and backward direction in a plan view of the ripper device;
a single shank disposed in alignment with the first cylinder in the forward and backward direction in the plan view such that, in the plan view, the first cylinder and the shank are disposed on a same line extending in the forward and backward direction; and
an arm supporting the shank, the arm overlapping the tube of the first cylinder in the plan view.

2. The ripper device according to claim 1, wherein
the arm has a tapered shape such that a size of the arm decreases toward the shank in the plan view.

3. The ripper device according to claim 1, wherein
a number of the first cylinder is only one.

4. The ripper device according to claim 1, wherein
the arm includes a first side face and a second side face on left and right sides thereof, and
the first side face is inclined with respect to the forward and backward direction so that the first side face approaches the second side face in the backward direction.

5. The ripper device according to claim 4, wherein
the second side face is inclined with respect to the forward and backward direction so that the second side face approaches the first side face in the backward direction.

6. The ripper device according to claim 1, wherein
the arm includes
a first arm proximal end attached to the work vehicle;
a second arm proximal end attached to the work vehicle, the second arm proximal end being disposed away from the first arm proximal end in a left and right direction; and
a concave portion disposed between the first arm proximal end and the second arm proximal end in the left and right direction,
a length of the concave portion in the forward and backward direction is equal to or less than one-third a length of the arm in the forward and backward direction.

7. The ripper device according to claim 1, further comprising
a second cylinder disposed on a lateral side of the first cylinder in the plan view, the second cylinder being configured to actuate the shank,
a part of the arm being located under the second cylinder.

8. A work vehicle, comprising:
a vehicle body;
a ripper device attached to a rear part of the vehicle body; and
an imaging device arranged and configured to capture images of a ripper tip of the ripper device;
the ripper device including
a first cylinder including a tube and a rod, the first cylinder being disposed to extend and retract in a forward and backward direction in a plan view of the work vehicle;
a shank disposed in alignment with the first cylinder in the forward and backward direction in the plan view; and
an arm supporting the shank, the arm overlapping the tube of the first cylinder in the plan view.

9. The work vehicle according to claim 8, wherein
the imaging device is attached to an end on a left or right side of the rear part of the vehicle body.

10. The work vehicle according to claim 8, wherein
the arm has a tapered shape such that a size of the arm decreases toward the shank in the plan view.

11. The work vehicle according to claim 8, wherein
the first cylinder is attached to a center part of the vehicle body in a vehicle width direction.

12. The work vehicle according to claim 8, wherein
the imaging device is disposed laterally outward of a proximal end of the arm at the rear part of the vehicle body.

13. The work vehicle according to claim 8, wherein
the imaging device is disposed higher than the arm at the rear part of the vehicle body.

14. The work vehicle according to claim 8, wherein
the vehicle body further includes a crawler belt disposed on a lateral side of the vehicle body, and
the crawler belt is disposed under the imaging device.

* * * * *